United States Patent

Goshima et al.

[15] 3,702,506

[45] Nov. 14, 1972

[54] MAGNETIC RECORDING-REPRODUCING DEVICE CAPABLE OF AUTOMATIC REPETITIVE REPRODUCTION

[72] Inventors: Takeshi Goshima; Yasutaka Iwawaki; Yutaka Kohtani, all of Tokyo, Japan

[73] Assignee: Canon Kabushiki Kaisha, Tokyo, Japan

[22] Filed: Nov. 18, 1970

[21] Appl. No.: 90,639

[30] Foreign Application Priority Data

Nov. 27, 1969 Japan ......................44/94843

[52] U.S. Cl. .............................35/35 C, 179/100.2 S

[51] Int. Cl. ..............................................G09b 5/04

[58] Field of Search............35/35 C; 179/100.2 MD, 179/100.2 S, 100.2 Z

[56] References Cited

UNITED STATES PATENTS

| | | | |
|---|---|---|---|
| 2,876,561 | 3/1959 | Horne | 35/35 C |
| 3,059,348 | 10/1962 | Mezzacappa | 35/35 C |
| 3,269,033 | 8/1966 | Redfield et al. | 35/35 C |
| 3,405,461 | 10/1968 | Joslow | 35/35 C |
| 3,596,007 | 7/1971 | Price et al. | 35/35 C X |

FOREIGN PATENTS OR APPLICATIONS

| | | | |
|---|---|---|---|
| 771,104 | 3/1957 | Great Britain | 35/35 C |

*Primary Examiner*—Wm. H. Grieb
*Attorney*—Ward, McElhannon, Brooks & Fitzpatrick

[57] ABSTRACT

A magnetic recording-reproducing device capable of automatic repetitive reproduction, especially suitable for education or dictation, which uses a master tape for recording thereon information units and tim signals representing the various lengths of such information units, wherein the information units are transferred from the master tape onto an endless magnetic recording medium whose velocity of movement may be varied in accordance with the time signals on the master tape so that the endless magnetic recording medium may be driven to move round at a velocity corresponding to the length of each information unit to be transferred thereonto, whereafter each transferred information unit may be repeatedly reproduced with simple operation of a necessary switch.

16 Claims, 10 Drawing Figures

MAGNETIC RECORDING-REPRODUCING DEVICE CAPABLE OF AUTOMATIC REPETITIVE REPRODUCTION

BACKGROUND OF THE INVENTION

1. Field of the Invention

This invention relates to a magnetic recording-reproducing device, and more particularly to a magnetic recording-reproducing device capable of automatic repetitive reproduction in which the cycles of reproducing operation may be variable in several ranges.

2. Description of the Prior Art

Magnetic recording-reproducing devices have been widely used for educational purposes, especially in the foreign language speaking training, or for dictation in offices or the like. The use of magnetic recording-reproducing devices as means for education or dictation is attributable mostly to the fact that such devices can record and reproduce speech signals very easily and repeatedly and that repeated reproduction of recorded information is very often required in the process of language learning or in dictation. This will be better understood by taking as an example the case of foreign language learning.

In foreign language learning, especially as viewed in the aspect of speaking ability, it is well known to repeat aural-oral practice with the same teaching material in order to achieve a greater learning effect. In learning to speak a foreign language, it is essential to orally imitate each given sentence pattern as a whole including its intonation and pronunciation of individual words and repeat such oral imitation, instead of learning such sentence pattern by simply repeating words.

The modern linguistic shows that the best way to master a foreign language is to repeat aural-oral practice with shorter sentences and gradually deal with longer sentences, and this may readily be realized empirically. However, each of the known magnetic recording-reproducing devices for language learning has required quite cumbersome operations to carry out the described repetitive oral practice and this has often hampered the learner's will to learn. One such device is disclosed in U.S. Pat. No. 2,876,561, wherein each unit of teaching material stored on the teaching track of a pre-recorded tape is reproduced for the learner to listen thereto and thereafter the learner orally imitates such reproduced teaching material while recording his oral imitation on the exercise track of the tape, whereafter the tape is rewound and the exercise track of the tape is changed over into reproducing mode. When the tape is again played back, the learner can listen to his own recorded oral exercise and compare it with the pre-recorded teaching material to find out his own defects or errors if any. The described cycle of operation may be repeated as frequently as desired by the learner. This system involved various cumbersome operations such as rewinding the pre-recorded tape by a pre-determined length and stopping it as well as changing over the mode of operation between the recording and reproducing modes, and such cumbersome operations have seriously hampered the learner's will to learn and, accordingly, the effect of learning by repetition.

An attempt to overcome such disadvantages has been proposed by Japanese Patent Publication No. 16828/1964, which shows a system whereby a pre-recorded tape is automatically rewound by a predetermined length and then changed over into the reproducing mode to play back the pre-recorded tape when the reproduction of the teaching material recorded in the tape or the recording of the leaner's oral exercise has been completed. This system, however, entails much complicated construction of the drive mechanism and moreover, the pre-recorded tape employed with this system is a dual-track tape which must also serve as an exercise tape, and this has often led to an undesirable result that the pre-recorded teaching material may be erased inadvertently during the use of the tape. Another disadvantage of this system is that the pre-recorded tape is short-lived because it is repeatedly rewound at high speed for the repeated oral practice. A further disadvantage is that the predetermined amount of the tape rewind does not meet the desire of advanced learners who may want to learn longer units of teaching material. Thus, the above-described system is merely nominal as the means of repetition learning and could never provide an essentially effective educational equipment.

Also, where the magnetic recording-reproducing device of the described type is used for the purpose of dictation, it is often desired to repeatedly reproduce a certain part of recorded information, whereas it has been very difficult to reproduce only such part of the recorded information. This is because the information to be reproduced is variable in length and it is very difficult to foresee the amount of the tape to be rewound or, in the case of another tape used for copying and reproducing the original record, the amount of information to be copied.

SUMMARY OF THE INVENTION

It is an object of the present invention to overcome the above-described disadvantages inherent to the conventional magnetic recording-reproducing devices and to provide a magnetic recording-reproducing device capable of automatic repetitive reproduction in which the cycle of reproducing operation may be automatically varied in accordance with the length of the information to be repeatedly reproduced.

It is another object of the present invention to provide a magnetic recording-reproducing device capable of automatic repetitive reproduction using a master tape for recording thereon information units and time signals representing the various lengths of such information units, wherein the information units are transferred from the master tape onto an endless magnetic recording medium whose velocity of movement may be varied in accordce with the time signals on the master tape so that the endless magnetic recording medium may be driven to move round at a velocity corresponding to the length of each information unit to be transferred thereonto, whereafter each transferred information unit may be repeatedly reproduced.

It is still another object of the present invention to provide a magnetic recording-reproducing device for learning by repetition which uses a pre-recorded master tape storing thereon units of teaching material having various lengths and which is very simple to operate for carrying out the method of learning by repetition.

These and other objects and features of the present invention will become fully apparent from the following detailed description of the preferred embodiments thereof taken in conjunction with the accompanying drawings.

BRIEF DESCRIPTION OF THE DRAWINGS

FIGS. 1 (B), 1(C), 1(D), 1(E) and 1(F) are block diagrams of the control circuits incorporated in the device of FIG. 1(A).

DESCRIPTION OF THE PREFERRED EMBODIMENTS

Figures 1A, 1B, 1C, 1D, 1E, 1F:
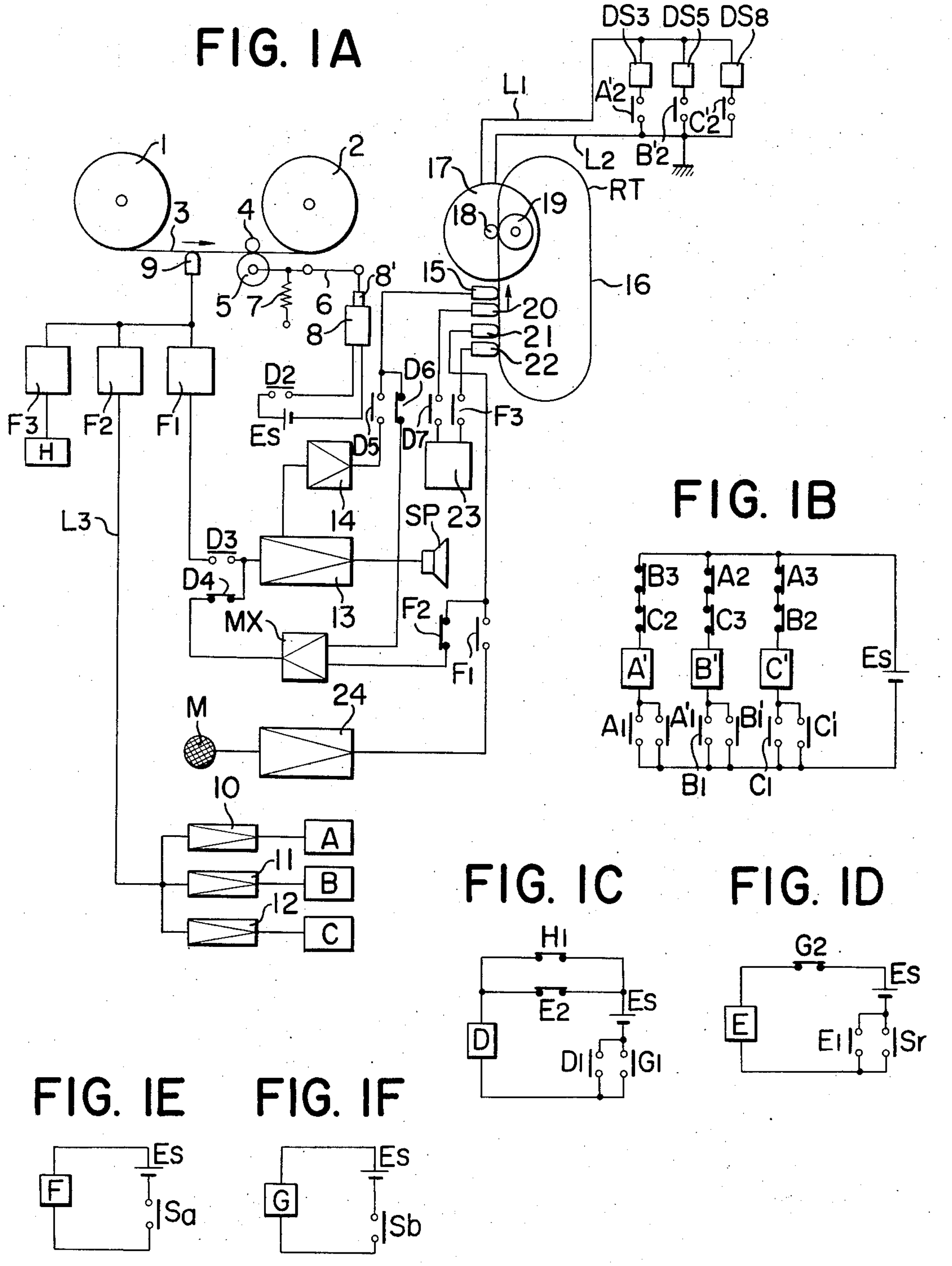
FIG. 1 (A) is a diagrammatic view schematically showing the entire arrangement of the magnetic recording-reproducing device for educational purposes capable of automatic repetitive reproduction according to an embodiment of the present invention.

Referring to FIG. 1(A), the magnetic recording-reproducing device in a preferred form of the present invention includes a supply reel 1 and a take-up reel 2 for supplying and taking up a master tape 3. The supply and take-up reels 1 and 2 are driven from a reel driving mechanism, not shown, during the reproducing operation so that the tape 3 is supplied from the supply reel 1 to the take-up reel 2 via a capstan 4 which is driven to rotate at a predetermined velocity by an unshown motor. Opposed to the capstan 4 is a pinch roller 5 which is rotatably mounted at one end of a pinch roller arm 6 pivotally mounted at the center thereof. A return spring 7 is connected to the pinch roller arm 6, the other end of which is operatively connected to an actuator 8' forming one end of a plunger 8, so that actuation of the plunger 8 causes the pinch roller 5 to be urged into contact with the capstan 4 with the master tape 3 therebetween. Thus, the master tape 3 may be driven to move at a predetermined velocity. A magnetic reproduce head 9 for reproducing the master tape 3 is provided between the supply reel 1 and the capstan 4, and filters F1, F2 and F3 are connected in parallel with the output of the reproduce head 9. The filter F1 is directed to pass therethrough only speech signals representing units of information recorded on the master tape 3 as they are reproduced by the head 9. The filter F2 is directed to pass therethrough only time representing signals recorded on the master tape 3 for each information unit, and the filter F3 is directed to pass therethrough only master tape stop signals recorded on the master tape 3 for each information unit.

Figure 2:
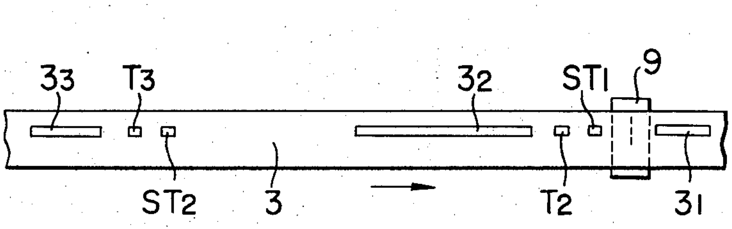
FIG. 2 is a view for illustrating the manner in which time representing signals are recorded on the master tape used with the device of FIG. 1(A).

On the master tape 3 there are sequentially recorded units of teaching material $3_1$, $3_2$, $3_3$ and so on at intervals greater than the lengths thereof, as shown in FIG. 2. On the same tape 3 there are also recorded stop signals ST1, ST2 and so on rearwardly of the respective units of teaching material at intervals substantially equal to the lengths thereof. At the top of the respective units of teaching material there are recorded time representing signals such as T2, T3 and so on.

The stop signals and the time representing signals may be sine wave signals of different frequencies. For example, the stop signals may be sine wave signals of 200 Hz, and the time representing signals may be sine wave signals of 50 Hz and 100 Hz for units of teaching material having lengths corresponding to 1.5, 2.5 and 4 seconds, respectively.

Tuning amplifer circuits 10, 11 and 12 are connected in parallel with the output of the filter F2 so as to amplify the time representing signals of 50 Hz, 70 Hz and 100 Hz passed through the filter F2. The outputs of the respective tuning amplifier circuits 10, 11 and 12 are connected with relays A, B and C having relay contacts A1–A3, B1–B3 and C1–C3, so that these contacts are actuated when the respective relays are energized by the associated tuning amplifier circuits.

The output of the filter F1 is connected with the input of a main amplifier circuit 13 through a contact D3 of a relay D to be described, so that the output of the filter F1 is amplified by the main amplifier circuit 13 and vocalized through a loudspeaker SP. The main amplifier circuit 13 comprises a pre-amplifier and a main amplifier. The output of the pre-amplifier is connected with the input of a record amplifier circuit 14, through which speech signals reproduced by the reproduce head 9 is superposed on an AC bias current and applied to a record-reproduce head 15 through a contact D5 of the relay D to be described.

An endless magnetic tape 16 is driven to move round at a predetermined velocity by a motor 17 while being urged into contact with a capstan 18 rotatable with the output shaft of the motor 17 by a pinch roller 19.

Figure 3:
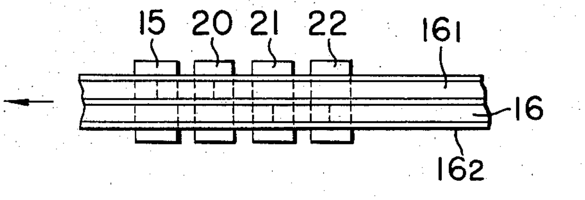
FIG. 3 is a view for showing the positional relationship between an endless tape used with the device of FIG. 1(A) and the various magnetic heads.

The length of the endless tape 16 is selected such that when it is moved at the lowest velocity as will be described later, its cycle of one rotation equals at best twice the length of time, say, 8 seconds, required for reproducing the longest one of the units of teaching material recorded on the master tape 3, namely equals 16 seconds. As shown in FIG. 3, the magnetic head 15 corresponds to the upper track $16_1$ of the endless tape 16. An erase head 20 disposed adjacent to the head 15 also corresponds to the upper track $16_1$ of the endless tape 16. Another magnetic record-reproduce head 21 and another erase head 22 are provided in side-by-side relationship to correspond to the lower track $16_2$ of the endless tape 16.

An erasing current generator circuit 23 is connected with the erase heads 20 and 22 through a normally open contact D7 of the relay D and a normally closed contact F3 of the relay F to be described, so that an erasing current is selectively applied to these erase heads upon actuation of the respective relay contacts D7 and F3. A microphone M may be connected with a record amplifier circuit 24, whose output is connected with the magnetic head 21 through a relay contact F1 to be described. A mixing amplifier circuit MX has its input connected with the head 15 through a relay contact D6 and with the head 21 through relay contacts F1 and F2 so as to mix together the signals recorded on the upper and lower tracks $16_1$ and $16_2$ of the endless tape 16.

As shown in FIG. 1(C), the relay D is connected in series with a DC drive power source Es, on the one hand, through a parallel connection of a normally closed contact E2 of a relay E and a normally closed relay contact H1 connected with the output of the filter F3 as will be described, and on the other hand, through a parallel connection of normally open contacts D1 and G1 of relays D and G. The relay E, as shown in FIG. 1(D), is connected in series with the DC power source Es, on the one hand, through the normally closed contact G1 of relay G, and on the other hand, through a parallel connection of a normally open contact E1 and a contact Sr adapted to close in response to an operation mode change-over for stopping the master tape 3 while allowing the endless tape 16 to continue its movement for repeatedly reproducing the teaching material transferred thereonto from the master tape. The relay F is connected with the DC power source Es through a switch Sa which is closed by the learner when he desires to practice and record his oral exercise through the microphone M. The relay G is connected with the DC power source Es through a switch Sb which is closed by the learner when he desires to change over the circuit into the operation mode for playing back the master tape 3 to transfer the teaching material therefrom onto the endless tape 16. The change-over switches S*b* and S*r* are associated with different operating buttons, not shown. The switch S*b* is closed when its associated operating button is depressed to energize the motor for the master tape driving mechanism including the capstan 4 and take-up reel 2 and drive the endless tape capstan 18, and the switch S*r* is opened in response to the closing of the switch S*b*. The switch S*r* is closed when its associated operating button is depressed to deenergize the master tape driving mechanism while allowing only the endless tape 16 to continue its movement, and the switch S*b* is opened in response to the closing of the switch S*r*. Thus, the two switches S*b* and S*r* are so arranged that only one of them is closed while the other is opened.

As shown in FIG. 1(B), relays A', B' and C' are connected together in parallel. The relay A' is connected with the DC power source Es, on the one hand, through a serial connection of normally closed contacts B3 and C2 of relays B and C, and on the other hand, through a parallel connection of a normally open contact A1 of relay A and a self-hold contact A'1 of relay A'. The relay B' is connected with the DC power source Es on the one hand, through a serial connection of normally closed contacts A2 and C2 of relays A and C, and on the other hand, through a parallel connection of a normally open contact B1 of relay B and a self-hold contact B'1 of relay B'. The relay C8 is connected with the DC power source Es, on the one hand, through a serial connection of normally closed relay contacts A3 and B2, and on the other hand, through a parallel connection of a normally open relay contact C1 and a self-hold contact C'1 of the relay C'.

As shown in FIG. 1(A), the relays A', B' and C' have normally closed contacts A'2 and B'2 and C'2, which are respectively connected in series with DC drive power sources DS3, DS5 and DS8 of different outputs so as to apply different driving voltages to the motor 17. The output voltages of the DC power sources DS3, DS5 and DS8 are preset such that when the endless tape 16 is driven to move round by the motor 17 connected with these power sources, its cycle of one rotation is 3 seconds for the voltage from DS3, 5 seconds for the voltage from DS5 or 8 seconds for the voltage from DS8, that is, approximately twice the length of time required for reproducing each unit of teaching material recorded on the master tape 3.

In operation, an operating button, not shown, is depressed to close the change-over switch Sb to thereby energize the relay G, whose contact G1 is thus closed. Accordingly, as shown in FIG. 1(C), the relay D is energized to close its contact D2, whereby the plunger 8 is actuated by the DC drive power source Es and the actuator 8' thereof causes the pinch roller arm 6 to rotate clockwise against the force of the return spring 7, thus urging the pinch roller 5 through the master tape 3 into contact with the rotating capstan 4. As a result, the master tape 3 is driven to move from the supply reel 1 to the take-up reel 2. Assuming that the master tape 3 starts to move from the position ST1 in FIG. 2, the time representing signal T2 is reproduced by the head 9 as the tape moves. The time representing signal T2 is a sine wave signal whose frequency corresponds to the length of the unit of teaching material $3_2$ recorded on the master tape 3 rearwardly of the signal T2, or in other words, the frequency of the sine wave signal T2 is 100 Hz if the time required for reproducing the unit of teaching material $3_2$is 4 seconds, and therefore, in response to the signal reproduced by the head 9, the output of the filter F2 is applied to energize the relay C through the tuning amplifier circuit 12. Thus, the contact C1 of the relay C is closed to energize the relay C' in the circuit of FIG. 1(B). Since the relay C' maintains its self-hold contact C'1 closed even after the time representing signal T2 has been completely reproduced, it remains in its operative position to close its contact C'2. Thus, in FIG. 1(A), the motor 17 for driving the capstan 18 engaged by the endless tape 16 is rotated at a velocity corresponding to the output voltage of the power source DS8, so that the cycle of one rotation of the endless tape 16 is 8 seconds, i.e. twice the time of 4 seconds required for reproducing the unit of teaching material $3_2$ on the master tape 3.

On the other hand, the relay D is energized to close its contact D7 so as to pass an erasing current from the erasing current generator circuit 23 to the erase head 20 contacting the upper track $16_1$ of the endless tape 16, whereby the track $16_1$ is erased. At the same time, the contacts D3 and D5 of the relay D are closed, and when the head 9 starts to reproduce the unit of teaching material $3_2$ on the master tape 3, the output of the head 9 is passed through the filter F1 and amplified through the main amplifier circuit 13 and thus, the unit of teaching material $3_2$ is vocalized through the loudspeaker SP. A part of the output of the main amplifier circuit 13 is applied to the head 15 through the record amplifier circuit 14 and the contact D5 of the relay D, to thereby transfer the unit of teaching material $3_2$ onto the upper track $16_1$ of the endless tape which has been erased by the erase head 20. Since the cycle of one rotation of the endless tape 16 is just twice the time required to reproduce the unit of teaching material $3_2$ on the master tape 3, the unit of teaching material $3_2$ is transferred by the head 15 onto one half of the entire length of the upper track $16_1$ on the endless tape 16.

Subsequently, the stop signal ST2 on the master tape 3 is reproduced by the head 9, whose output is passed through the filter F3 to energize the relay H to open the normally closed contact H1 thereof. Thus, the relay D is deenergized and the contact D2 thereof is opened to deenergize the plunger 8, whereby the pinch roller arm 6 is biased by the return spring 7 to disengage the pinch roller 5 from the master tape 3. As a result, the master tape 3 is stopped from moving, while the endless tape 16 continues to move round.

When the learner wants to practice oral exercise with unit of teaching material $3_2$ after listening to it, he may depress a repetitive play-back button (not shown) to close the switch Sr before the reproduction of the teaching material $3_2$ is completed, i.e. before the stop signal ST2 is reproduced by the reproduce head 9. Upon closing of the switch Sr, the relay E is energized to self-hold with the aid of its contact E1, as shown in FIG. 1(D). On the other hand, the contact E2 of the relay E is opened, and therefore, when the reproduce head 9 reproduces the stop signal ST2 to open the contact H1, the relay D maintains its inoperative position as shown in FIG. 1(C) so that the endless tape 16 continues to move round while the master tape 3 is stopped. Thus, as the endless tape 16 makes one round and the transferred teaching material $3_2$ thereon is reproduced by the head 15, the output of the head 15 is passed through the circuit of mixing amplifier circuit MX — contact D4 — main amplifier circuit 13 — loudspeaker SP so that the transferred teaching material is vocalized.

Thus, the endless form of the tape 16 allows the transferred teaching material $3_2$ thereon to be reproduced repeatedly at a time interval approximately equal to the length of the teaching material $3_2$, and such time interval may be utilized by the learner to practice his oral practice. For this purpose, the switch Sa is closed to energize the relay F, and thereafter the learner may start his oral practice toward the microphone M.

Upon energization of the relay F, its contact F1 is closed while its contact F2 is opened, so that the output of the microphone M is applied through the record amplifier circuit 24 to the magnetic head 21, which thus records the learner's oral practice on the lower track $16_2$ of the endless tape 16.

Subsequently, when the switch Sa is opened, the relay F is again deenergized to change over its contacts F1, F2 and F3 so that the head 21 reproduces the learner's recorded oral practice and the output of the head 21 is passed through the circuit of contact F2 — mixing amplifier circuit MX — contact D4 — main amplifier circuit 13 — loudspeaker SP.

By listening to the transferred teaching material on the upper track of the endless tape 16 and thereafter making his oral practice, the learner is ensured to record the oral practice on the lower track of the same tape 16 in that section thereof which corresponds to the blank succeeding to the transferred teaching material. In this way, the transferred teaching material and the learner's oral practice are recorded on the different tracks $16_1$ and $16_2$ of the endless tape 16 in such a manner that they together form a substantially continuous circle, and thus the learner is enabled to repeatedly listen to the teaching material and his oral practice without any loss of time.

The aural-oral practice described above may be repeated as frequently as desired, by operating the switch Sa.

When the learner wants to advance to the next unit of teaching material $3_3$, he may close the switch Sb which has been opened in response to the closing of the switch Sr, thereby energizing the relay G. This causes the contact G1 to be closed to energize the relay D to closs its contact D2, as described previously, and thus the plunger 8 is again actuated to urge the pinch roller 5 and the master tape 3 into contact with the capstan 4. As a result, the master tape 3 starts to move from the supply reel 1 to the take-up reel 2 and the time representing signal ST2 is reproduced by the reproduce head 9, whose output is passed through the filter F2 and tuning amplifier circuit 10 to energize the relay A and then the relay A, whereby the motor 17 is driven to rotate at a velocity corresponding to the length of the teaching material $3_3$ so that the cycle of one rotation of the endless tape 16 may be approximately twice the length of time required to reproduce the teaching material $3_3$. Thus, the teaching material $3_3$ on the master tape 3 is reproduced and transferred onto the endless tape 16 just in the same way as described previously. Repeated reproduction and oral practice of the transferred teaching material $3_3$ may be accomplished also in the same way as described above, by the change-over of the switches Sr and Sa respectively.

It will thus be noted that each of various units of teaching material pre-recorded on the master tape at the intervals substantially corresponding to the lengths of these units is transferred onto the endless tape with a blank equal to each of those intervals. This enables the learner to reproduce each transferred unit of teaching material while listening thereto, and thereafter utilize the blank on the endless tape to practice and record his own oral exercise and then play back the endless tape. In this way, the learner can repeatedly carry out a series of various operation cycles such as reproduction of the pre-recorded teaching material, recording of this first oral imitation, reproduction of the transferred teaching material, reproduction of his own recorded oral practice, reproduction of the transferred teaching material, and recording of his second oral imitation. During these processes, the learner is allowed to devote all his attention to learning while simply manipulating the operating button to change over the switch Sa between the recording mode and the playback mode, and this greatly helps the learner to increase his learning efficiency with simple mechanical manipulation. Furthermore, when the learner advances to the next unit of teaching material, the cycle of one rotation of the endless tape may be varied in accordance with the length of the unit of teaching material so that the learner can carry out a series of operation cycles similar to those described above, without loss of time and with simple manipulation.

Figure 4:
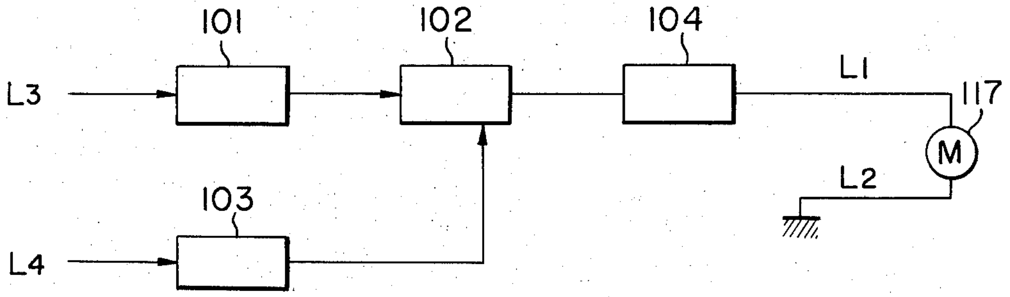
FIG. 4 is a block diagram showing a partly modified form of the drive motor control circuit according to another embodiment of the present invention.
Figure 5:
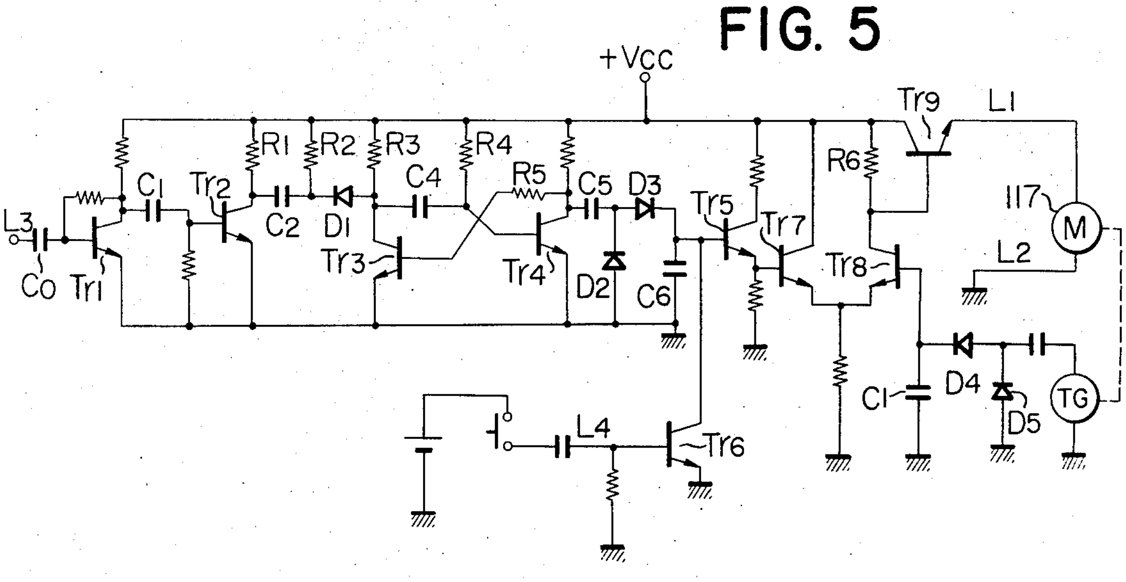
FIG. 5 is a circuit diagram showing the details of the circuit of FIG. 4.

Referring now to FIGS. 4 and 5, there is shown another circuit arrangement of the present invention, in which the number of revolutions of the motor 17 may be variable not only in three steps as in the previous embodiment, but also may be variable continuously in more than three multiple steps.

As shown in FIG. 4, this alternative embodiment employs a modified form of control circuit for continuously varying the number of revolutions of the motor 17 in accordance with the lengths of units of teaching material $3_1$, $3_2$, $3_3$ and so on recorded on the master tape 3, instead of employing the tuning amplifiers 10–12 and relays A, B and C connected with the filter F2 via lead wire L3 shown in FIG. 1, the circuit of FIG. 1(B) and the control circuit components connected with the motor 17 via power supply leads L1 and L2.

In FIG. 4, a frequency-voltage converter circuit 101 is connected with the filter F2 (not shown) via lead wire L3 for converting the frequency components of time representing signals T1, T2, T3 and so on passed through the filter F2 into DC voltages. A signal holding circuit 102 is connected with the output of the frequency-voltage converter circuit 101 for storing and holding the DC voltages produced by the converter circuit 101. A reset circuit 103 is connected in parallel with the signal holding circuit 102 for resetting the signal holding circuit. The output of the signal holding circuit 102 is connected with a velocity control circuit 104 for providing a driving voltage corresponding to the DC voltage produced by the signal holding circuit 102, and an endless tape driving DC motor 117 (equivalent to the motor 17 of FIG. 1) is connected with the output of the velocity control circuit 104.

An input signal terminal L4 for the reset circuit 103 is so arranged that a reset input is applied to the terminal L4 in response to the change-over switch S*b* of FIG. 1 when the master tape is played back to transfer the teaching material therefrom onto the endless tape.

Thus, when the play-back of the master tape 3 is started, the signal holding circuit 102 is reset through the reset circuit 103 and then a time representing signal is applied through the filter F2 to the frequency-voltage converter circuit 101, where the time representing signal is converted into a DC voltage corresponding to the frequency component of that signal. The value of the DC voltage is stored in the signal holding circuit 102 and applied through the velocity control circuit 104 to the DC motor 117. Thus, the DC motor 117 is driven to rotate by a driving current corresponding to the DC voltage stored in the signal holding circuit 102, and accordingly the motor is driven at a velocity determined by the time representing signal on the master tape so that the cycle of one rotation of the endless tape can be varied in accordance with the length of each unit of teaching material.

FIG. 5 illustrates in detail the circuit of FIG. 4 shown in block diagram. As shown, transistors T*r*1 and T*r*2 form an amplifier circuit for amplifying in two steps the time representing sine-wave signals T1, T2 and T3 applied from the input terminal L3 through coupling capacitors $C_0$ and $C_1$ and converting these sine-wave signals into substantially alternating, saturated trapezoidal waveforms. A capacitor $C_2$ and a resistor $R_2$ together constitute a differentiation circuit for differentiating an output provided at the output load $R_1$ of the transistor Tr2. The differentiation circuit is followed by a rectifier diode $D_1$ and nomostable multivibrators T*r*3 and T*r*4, whose inversion time is determined by a time constant circuit provided by a capacitor $C_4$ and a resistor $R_4$. Thus, trigger signals may be applied through the diode $D_1$ to the monostable multivibrators T*r*3 and T*r*4.

The time constant of the time constant circuit provided by the capacitor $C_4$ and resistor $R_4$ is selected to a sufficiently small value as compared with the periods of the time representing signals T1, T2 and so on. A time representing sine-wave signal applied to the terminal L3 is amplified by the amplifier transistors T*r*1 and T*r*2 until it is saturated, and converted into a trapezoidal output signal, which is differentiated by the resistor $R_2$ and capacitor $C_2$. The differentiated output in the falling portion of the trapezoidal output is applied as a trigger input to the base of the monostable multivibrator T*r*4 through the diode $D_1$. As the result, the multivibrator circuit is inverted to turn off the transistor Tr4, whose collector potential is thus increased. Thereafter, before the trigger signal is applied through the diode $D_1$, the monostable multivibrator circuit of T*r*3 and T*r*4 is returned to its original condition because the time constant is small.

Therefore, the monostable multivibrator circuit continues to produce a pulse-like output signal as long as the time representing signal is reproduced. Since the output pulse signal from the monostable multivibrator circuit is further applied to the opposite ends of a large capacitor $C_6$ through a capacitor $C_5$ and a rectifier circuit provided by diodes $D_2$ and $D_3$, the number of pulses applied to the capacitor $C_6$ becomes greater as the frequency of the time representing signal is higher, or in other words, the unit of teaching material is longer. Accordingly, the charging potential at which the capacitor $C_6$ is charged in response to the output pulse signal from the monostable multivibrator circuit is also increased. The charging potential of the capacitor C6 is amplified by a transistor T*r*5, whose output is applied to the base of a transistor T*r*7 which, together with a transistor T*r*8, constitutes a differential amplifier circuit. To the base of the other transistor T*r*8 forming the differential amplifier circuit, there is applied a DC voltage generated by a generator TG driven by the DC drive motor 117, and smoothed by a smoothing circuit constituted by diodes $D_4$ and $D_5$ and capacitor $C_7$. Therefore, if there is a difference between the input voltages at the bases of the transistors T*r*7 and T*r*8, the collector current of the transistor T*r*8 will be varied in such a direction as to negate the voltage difference and the quantity of current passing through a transistor T*r*9 will be controlled in accordance with such variation in the collector current of the transistor T*r*8, so as to control the drive current from the source V cc. As a result, the drive motor 117 will drive the endless tape to move round at a cycle corresponding to the charging voltage of the capacitor $C_6$ or to the length of the unit of teaching material.

Thus, the embodiment now under discussion differs from that of FIG. 1 in that the master tape may contain more than three including three units of teaching material having different lengths and time representing signals having frequency components corresponding to such different lengths, and that these time representing signals may be recorded on the master tape at the top of each unit of teaching material in the manner as shown in FIG. 2, so that the cycle of one rotation of the endless tape can be varied in multiple steps in accordance with the various lengths of the units of teaching material on the master tape.

In the above-described embodiments, if the information recorded on the master tape is not teaching material but a recorded dictation, the length of the endless tape may be substantially equal to, rather than twice, the length of the information unit recorded on the master tape, whereby it is ensured that the information unit is transferred onto the endless tape over the entire length thereof irrespective of the variable length of the information unit. Thus, the device of the present invention can be effectively used as an equipment for dictation.

Although the present invention has been shown and described as using an endless magnetic tape, it is also possible to employ any other endless type of magnetic recording medium having a similar function such as magnetic disc or drum or the like.

As has been discussed hitherto, according to the present invention, use is made of a master tape on which is recorded signals representing the cycles of one rotation of an endless magnetic recording medium corresponding in length to the information units recorded on the master tape, and when it is desired to repeatedly reproduce any particular one of such information units, the endless magnetic recording medium is moved round at a cycle of one rotation corresponding to the length of that particular information unit. This solves the problem of loss of time which has existed in the conventional equipments using a lengthy magnetic recording medium for recording and reproducing a short unit of information.

It will also be seen in the present invention that when the material for conversation practice pre-recorded on the master tape consists of mixed longer and shorter units or sentences, each of such longer and shorter units or sentences may be separately transferred onto the endless tape so as to enable the learner to repeatedly reproduce each of them with high efficiency until he acquires to speak the given material. Of course, this greatly enhances the development of the learner's speaking ability in a foreign language and is very useful to repeatedly and completely reproduce each of information units having various lengths.

What is claimed is:

1. A magnetic recording-reproducing device capable of automatic repetitive reproduction and for repeatedly reproducing information units of various lengths, comprising: a master tape having pre-recorded thereon a plurality of information units different in length, an endless magnetic recording medium, transferring means for reproducing the information units recorded on the master tape and transferring the reproduced information units onto said endless magnetic recording medium;

first reproducing means for reproducing time representing signals recorded on the master tape at the top of each of said information units and having components corresponding to the lengths of said information units;

driving means for driving said endless magnetic recording medium and including a driving motor, said driving means being variable in driving velocity;

velocity varying means associated with said driving means to vary the driving velocity of said driving means in response to the output signal of said first reproducing means and to arrange said driving means to drive said endless magnetic medium to move round at a cycle of one rotation corresponding to the length of each of the information units; and second reproducing means for reproducing the information units transferred onto said endless magnetic recording medium;

whereby said endless magnetic recording medium is driven to move round at a cycle of one rotation corresponding to the length of each of the information units recorded on said master tape, thereby repeatedly reproducing each of the transferred information units.

2. A device according to claim 1, wherein said transferring means includes a master tape driving member, a control circuit for controlling the drive of said driving member, and a reproduce member electrically connected with the input of said control circuit, said reproduce member reproducing stop signals recorded on said master at the positions thereof corresponding to the terminations of the respective information units recorded on the same tape, thereby operating said control circuit to stop said driving member so that the master tape may be automatically stopped after each of the information units thereon has been reproduced.

3. A device according to claim 1, wherein said first reproducing means includes at least one tuning circuit, and said time representing signals have signal components of different frequencies corresponding to the respective information units, said frequencies tuning with said one tuning circuits to apply the output signal of said one tuning circuit to said velocity varying means.

4. A device according to claim 3, wherein said transferring means includes a filter member for passing therethrough only the information signal components of the information representing signals and the time representing signals recorded on said master tape, said information representing signals and said time representing signals being recorded on the same recording track of said master tape, said filter member passing therethrough only the components of said information representing signals but interrupting said time representing signals.

5. A device according to claim 3, wherein said first reproducing means includes a plurality of first switching members electrically connected to a plurality of tuning circuits respectively, each of said first switching members having a switching output terminal and an inverting switching output terminal therefor, and a plurality of second switching members corresponding to said first switching members, each of said second switching members being electrically connected to the switching output terminal and the inverting switching output terminal of a corresponding one of said first switching members so that said second switching members are operated in response to the logical sum of output signals appearing at said output terminals, nd wherein said velocity varying means includes a drive power source having a plurality of different output voltages for driving said driving means, the output terminals of said second switching members being electrically connected between the terminal of said power source and said driving motor.

6. A device according to claim 5, wherein said first and second switching members comprise relays, nd the output terminals of said switching members comprise the normally open contacts of said relays.

7. A magnetic recording-reproducing device capable of automatic repetitive reproduction adapted for the purpose of learning by repetition, comprising: a master tape storing thereon units of teaching material different in length, an endless magnetic recording medium, transferring means for separately reproducing each of the units of teaching material recorded on said master tape and transferring it onto said endless magnetic recording medium;

first reproducing means for reproducing time representing signals recorded on the master tape at the top of each of said units of teaching material and having components corresponding to the lengths of said units of teaching material;

driving means for driving said endless magnetic recording medium and including a driving motor, said driving means being variable in driving velocity;

velocity varying means associated with said driving means to vary the driving velocity of said driving means in response to the output signal of said first reproducing means and to set the driving velocity to a level for allowing approximately twice the length of each unit of teaching material to be transferred;

change-over means for stopping the movement of said master tape after said endless medium completes one-half cycle of rotation while operating only said driving means for said endless magnetic recording medium;

second reproducing means associated with said change-over means to reproduce each unit of teaching material to be transferred onto said endless magnetic recording medium; and recording-reproducing means for separately recording and reproducing speech signals of oral practice on said endless magnetic recording medium;

whereby said endless magnetic recording medium is driven to move round at a cycle of one rotation corresponding to the length of each of the units of teaching material recorded on the master tape and each unit of teaching material is transferred onto said endless medium within about one half of the entire length thereof, whereafter the transferred unit of teaching material may be repeatedly reproduced while speech signals of oral practice are recorded and reproduced separately on the same endless recording medium by means of said recording-reproducing means.

8. A device as defined in claim 7, wherein said units of teaching material are pre-recorded on said master tape at intervals substantially equal to the lengths of such units.

9. A device as defined in claim 8, wherein said transferring means includes a master tape driving member, a control circuit for controlling the drive of said driving member, and a reproduce member electrically connected with the input of said control circuit, said reproduce member reproducing stop signals recorded on said master tape at the positions thereof corresponding to the terminations of the respective units of teaching material recorded on the same tape, thereby operating said control circuit to stop said driving member so that the master tape may be automatically stopped after each of the units of teaching material thereon has been reproduced.

10. A device as defined in claim 7, wherein said velocity varying means includes a drive power source having a plurality of terminals whose output voltages differ from each other, and at least one switching member connected between said power source and said driving motor, said switching member being associated with the output of said first reproducing means to be selectively operable in response to the time representing signal reproduced by said first reproducing means so as to electrically connect said drive power source with said driving motor, whereby the motor is driven at a velocity corresponding to said time representing signal.

11. A device as defined in claim 10, wherein said velocity varying means further includes a holding circuit connected with said switching member and held by the time representing signal reproduced by said first reproducing means.

12. A device as defined in claim 1, wherein said first reproducing means includes a reproduce head and at least one filter member connected to the output of said head, said filter member producing time representing signal frequencies when the time representing signals of different frequency components are reproduced by said reproduce head, and said velocity varying means includes a frequency-voltage converter circuit having its input connected with said filter member, a voltage holding circuit connected with the output of said converter circuit, and a velocity control circuit connected with the output of said holding circuit to apply said output to said driving motor, said voltage holding circuit being supplied with voltages corresponding to said time representing signal frequencies from said frequency-voltage converter circuit to continuously control the amount of the driving current applied to said driving motor from said converter circuit in accordance with the time representing signal.

13. A device as defined in claim 12, wherein said voltage holding circuit resets its voltage to a preset start potential each time the master tape is started to move.

14. A device as defined in claim 12, wherein said frequency-voltage converter circuit comprises a differentiation circuit and a monostable multivibrator circuit.

15. A device as defined in claim 13, wherein said voltage holding circuit comprises a capacitator and a switching member inserted in the discharge circuit of said capacitor, said switching member being switched on in response to the start of said master tape.

16. A device as defined in claim 12, wherein said velocity control circuit includes a differential amplifier circuit, one input of which is supplied with the voltage from said voltage holding circuit and the other input is supplied with an output voltage of a generator driven from said driving motor, so that the output of said differential amplifier circuit produces a control current corresponding to the difference between said two differential input voltages and controlling said driving motor.

* * * * *